Figure 1:
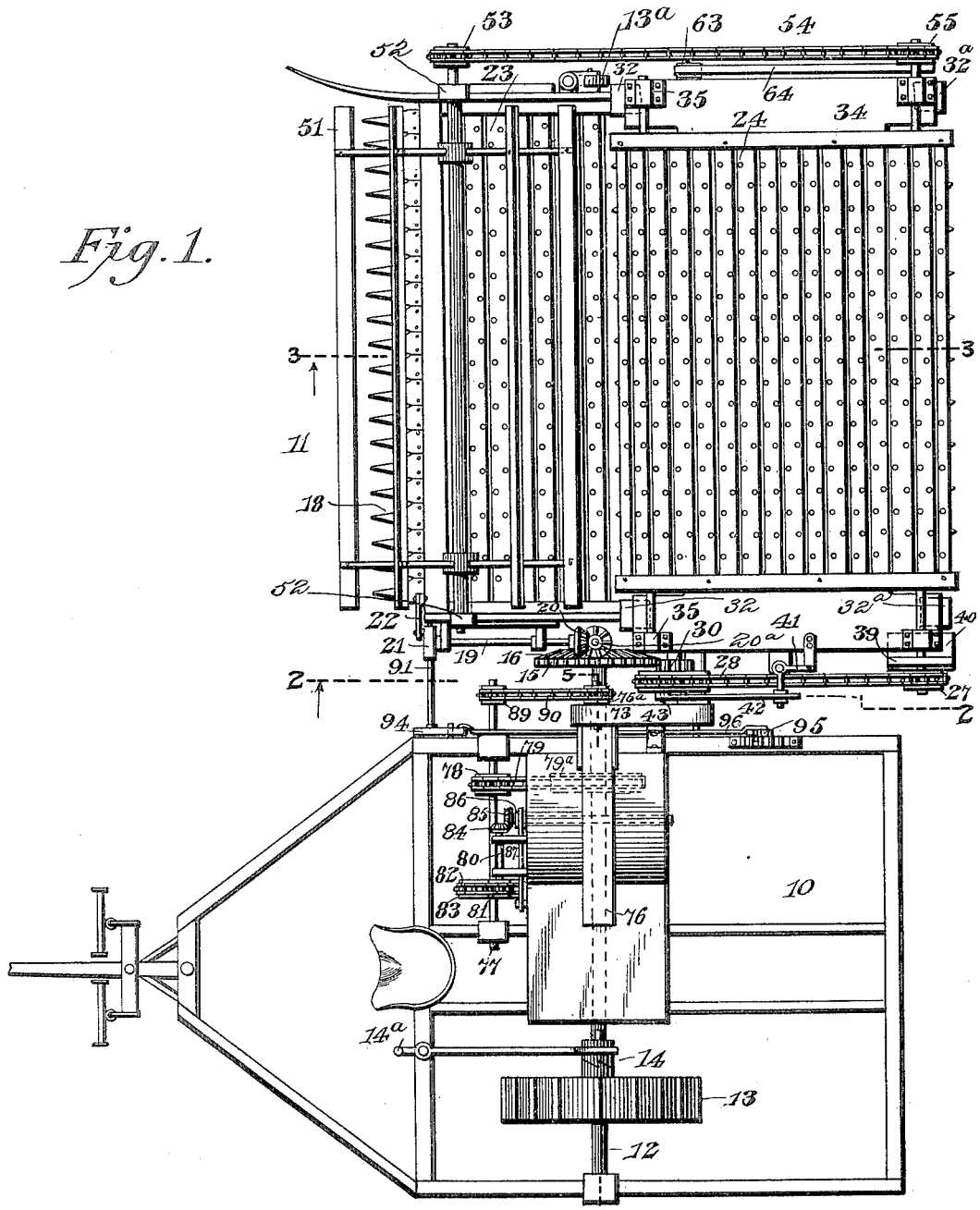

No. 640,372. Patented Jan. 2, 1900.
J. G. EVANS.
COMBINED HEADER AND THRESHER.
(Application filed Sept. 29, 1899.)
(No Model.) 3 Sheets—Sheet 2.

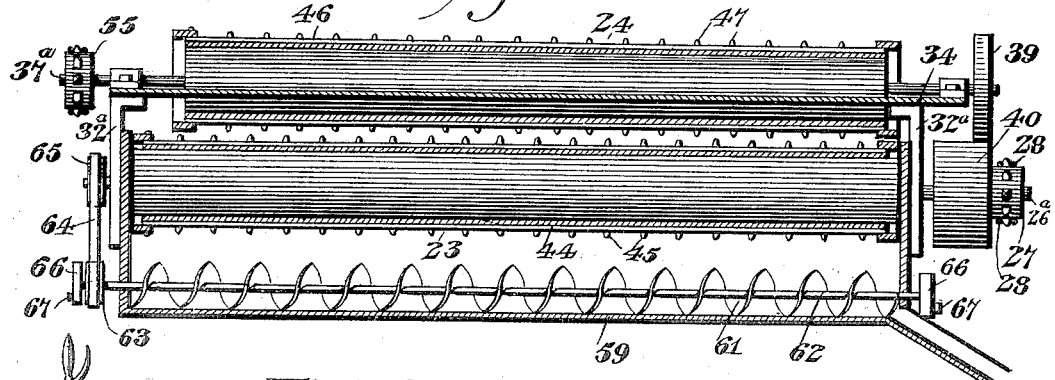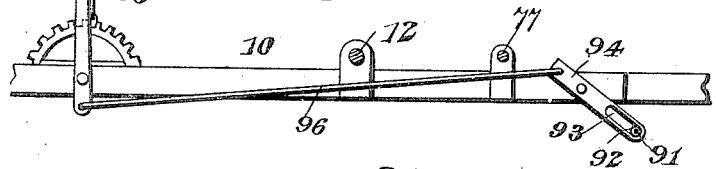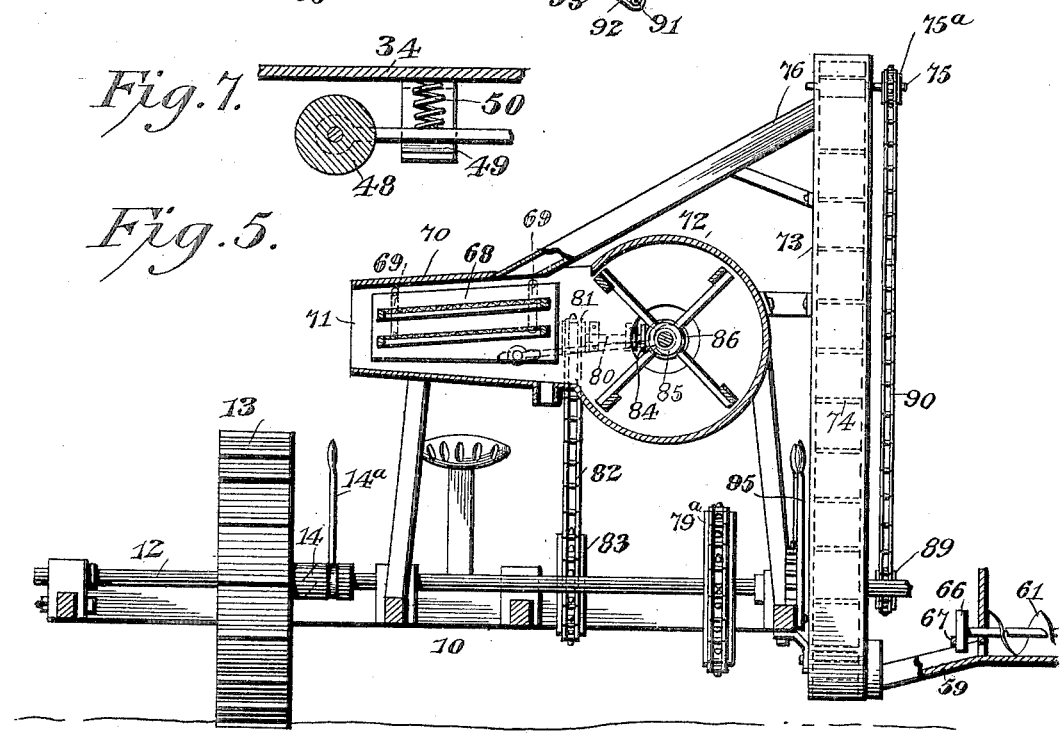

UNITED STATES PATENT OFFICE.

JOSEPH G. EVANS, OF WAITSBURG, WASHINGTON.

COMBINED HEADER AND THRESHER.

SPECIFICATION forming part of Letters Patent No. 640,372, dated January 2, 1900.

Application filed September 29, 1899. Serial No. 732,088. (No model.)

*To all whom it may concern:*

Be it known that I, JOSEPH G. EVANS, a citizen of the United States, residing at Waitsburg, in the county of Walla Walla and State of Washington, have invented a new and useful Combined Header and Thresher, of which the following is a specification.

My invention relates to a combined header and thresher for harvesting the heads of grain and threshing the same at one continuous operation in the open field.

The leading object of this invention is to provide a machine of this class with an improved threshing mechanism one element of which is in coöperative relation to the cutter mechanism and by which threshing mechanism the kernels or grains may be rubbed and separated from the straw immediately following the operation of harvesting the grainheads, such threshing mechanism being effective for discharging the straw at the rear of the machine and for delivering the grain and chaff into an elevator, by which they are carried to a cleaning-shoe.

A further object is to provide novel means for driving the parts of the threshing mechanism and of the cleaning and elevating mechanism from the main driving-shaft of the machine, and all of these elements are combined to operate in unison, so as to treat the grain properly at successive stages, to the end that it may be harvested, threshed, separated from the straw, elevated, and cleaned previous to bagging the same.

The first part of my invention consists in the combination, with a cutter mechanism, of a threshing mechanism comprising two endless aprons arranged one above the other in parallel relation and provided on their opposing surfaces with studs, teeth, or projections arranged to rub or thresh the grain from the straw, one of said aprons being longer than the other and arranged in coöperative relation to the cutter mechanism, so as to carry the grain below the other apron, means for propelling the upper apron for its upper lead to travel in an opposite direction to the corresponding lead of the lower apron, and means for giving to the upper apron a shaking motion or travel in a path at right angles to the path of the aprons, whereby the upper apron is reciprocated across the face of the lower apron and at the same time is propelled to travel in a path parallel therewith.

The invention further consists in the novel combination of mechanisms and in the construction and arrangement of parts, which will be hereinafter fully described and claimed.

To enable others to understand the invention, I have illustrated one embodiment thereof in the accompanying drawings, forming a part of this specification, and in which—

Figure 2:
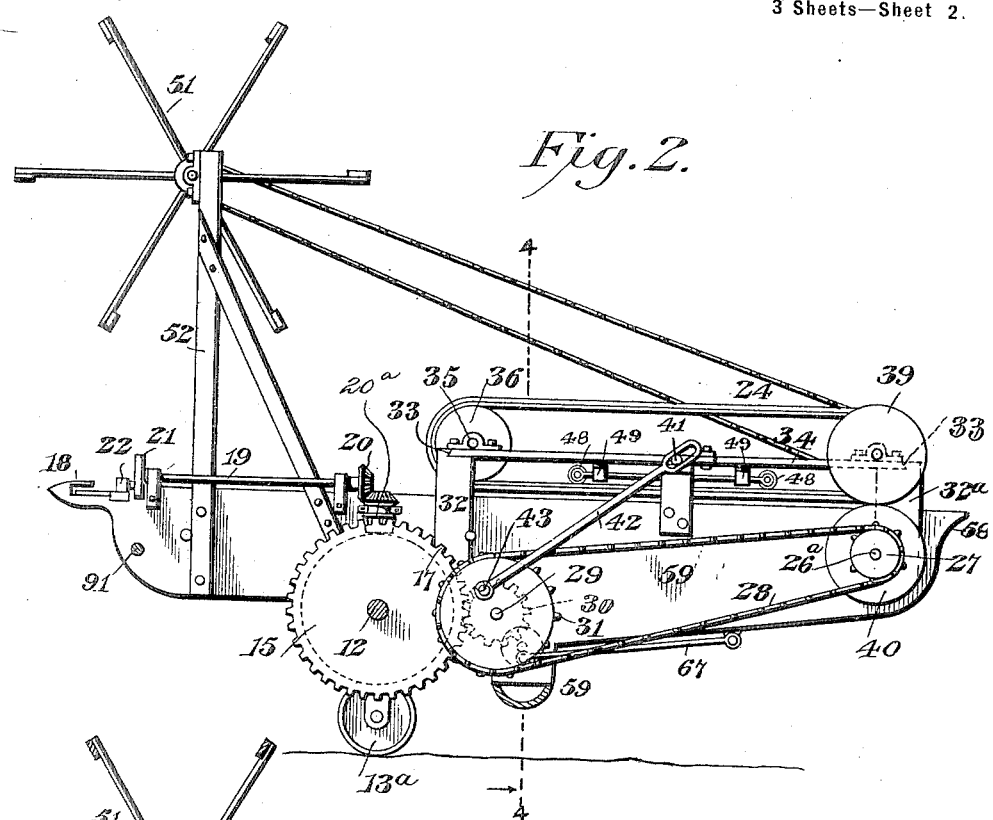
Figure 3:
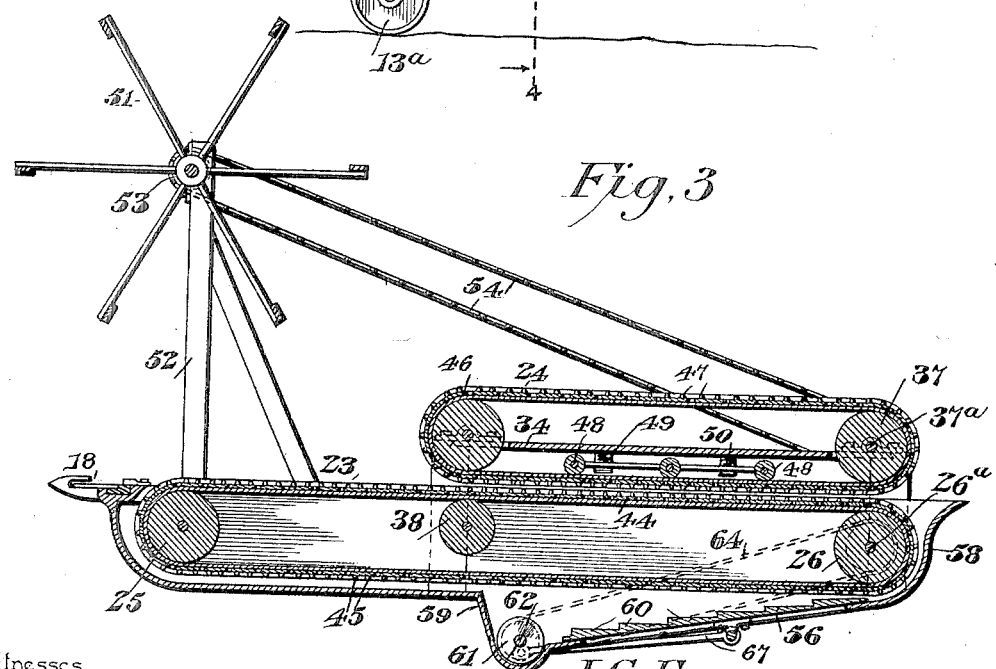

Figure 1 is a plan view of a combined header and thresher embodying this invention. Fig. 2 is a view in side elevation, partly in section, looking at one member of the two-part frame which carries the harvesting and threshing mechanism, the plane of the section being indicated by the dotted line 2 2 of Fig. 1 looking in the direction indicated by the arrow. Fig. 3 is a vertical sectional view taken in the plane indicated by the dotted line 3 3 of Fig. 1. Fig. 4 is a vertical transverse section through the threshing mechanism in the plane indicated by the dotted line 4 4 of Fig. 2 looking in the direction indicated by the arrow. Fig. 5 is a vertical transverse section through the prime member of the two-part frame, illustrating the cleaning-shoe and the elevator, the plane of the section being indicated by the dotted line 5 5 of Fig. 1. Fig. 6 is a detail fragmentary view of one means for adjustably connecting the frame member having the cutter apparatus with the prime member of the frame. Fig. 7 is a detail sectional view illustrating the means for pressing the upper threshing-apron normally in proper relation to the subjacent threshing and conveying apron.

The same numerals of reference are used to indicate like and corresponding parts in each of the several figures of the drawings.

The main frame of the machine of my invention consists of two members or sections arranged in substantially the same horizontal plane. The prime member 10 of this frame carries the cleaning mechanism, while the other frame member 11 supports the harvesting and threshing mechanisms. In suitable bearings on the prime frame member is journaled the horizontal main driving-shaft 12, on which is loosely fitted the ground-wheel 13. The frame member 10 is primarily supported by this ground-wheel in the manner similar to machines of this class, but the other frame member 11 has a caster-wheel 13ª, the latter supporting the grain end of the machine-frame. The ground-wheel is made fast with the main driving-shaft by one member of a clutch 14, adapted to be thrown by a lever 14ª into and out of engagement with the other member of a clutch, so that the ground-wheel may turn idly on the shaft, or it may be made fast therewith for the purpose of rotating the shaft from which the harvesting, threshing, elevating, and cleaning mechanisms are driven.

The main driving-shaft 12, which is supported by the prime frame member, has its inner end extended toward the frame member 11, and on this extended end of the main driving-shaft is secured a master-gear 15. This gear has one face thereof provided with a continuous series of bevel-gear teeth 16, and the periphery of said master-gear is cut to form the spur-gear teeth 17, the purpose of which will presently appear.

A cutter apparatus 18 of ordinary construction is carried by the front end of the frame member 11, said cutter apparatus being sustained at a suitable elevation above the ground for cutting off the heads of the standing grain. On the front inner portion of the frame member 11 is journaled a short horizontal shaft 19, the inner end of said shaft being provided with a bevel-gear pinion 20, which meshes with a pinion on the upper end of a short vertical shaft 20ª, provided at its lower end with a bevel-gear, which in turn is in mesh with the bevel-gear teeth 16 on the master-gear, thus driving the shaft 19 from said master-gear. The front end portion of the short shaft 19 has a crank-disk 21, to which is pivoted a pitman 22, that connects pivotally with the reciprocatory member of the cutter apparatus 18, thus reciprocating the cutter apparatus by connections with the shaft 19.

I will now proceed to describe the improved construction of threshing mechanism which I have invented for rubbing the kernels of grain from the straw immediately following the operation of harvesting the heads of the grain. This threshing mechanism in its broad aspect comprises two endless aprons and conveyers arranged in horizontal parallel positions on the frame member 11 and driven in directions which make the aprons coact in threshing the harvested grain-heads and conveying the latter to the rear end of the machine. These two aprons are indicated generally by the numerals 23 24, the lower apron 23 being considerably longer than the upper apron 24 and said lower apron arranged to directly receive the heads of grain from the cutter apparatus, whereby the lower apron serves as a conveyer for the harvested grain, because it transmits or carries the grain beneath the upper threshing-apron. The long lower threshing-apron and conveyer is supported by the rollers 25 26, which are arranged in horizontal positions parallel one to the other at the front and rear ends of the frame member 11. The front roller 25 has its shaft journaled in the frame member at a point contiguous to the cutter apparatus, so as to guide the front portion of the apron 23 in close relation to the cutter apparatus. The other roller 26 constitutes the means by which the endless traveling motion is given to the lower apron, the shaft 26ª of said apron-driving roller being provided with a sprocket-wheel 27. (See Figs. 1, 2, and 4.) An endless sprocket-chain 28 passes around the sprocket-wheel 27 and also around a gear element on a short counter-shaft 29, the latter being supported between the two frame members and parallel to the main driving-shaft 12. The gear element referred to as being supported by the counter-shaft is provided with a series of spur-gear teeth 30 and with sprocket-gear teeth 31, thus making the gear element a compound intermediate gear. That part of the compound intermediate gear having the spur-gear teeth 30 meshes with the spur-gear teeth 17 on the master-gear, while the other part of the compound intermediate gear having the sprocket-teeth 31 receives the sprocket-chain 28, whereby the chain may be propelled to rotate the apron-roller 26.

The frame member 11 supports or carries the posts or standards 32 32ª, which are secured firmly to both sides of the frame and extend upwardly therefrom above the lower apron 23. The standards 32 are arranged near the middle of the frame member, while the other standards 32ª are at the rear end of the apron 23, said standards having the grooved guides 33 in their upper ends. A horizontal floor or table 34 has its front and rear edges fitted slidably in the guideways of the posts or standards, and this floor or table is arranged to move in a path at right angles to the direction of travel of the aprons 23 24. The shaking-floor has the shaft-bearings 35 secured firmly thereto, and in the front pair of bearings is mounted the shaft of an idler-roller 36, while in the rear bearings on said shaking-floor is journaled the shaft of a driving-roller 37. These rollers are of corresponding diameter. They lie parallel to each other, and they are arranged in the same horizontal plane, so as to support the upper threshing-apron parallel to the lower threshing-apron, as shown clearly by Figs. 2, 3, and 4. The lower apron 23 being quite long, it is liable to sag, owing to the weight of the load thereon at points between the rollers 25 26; but to minimize this sagging of the apron I have provided an idler-roller 38, which is journaled in the sides of the frame member 11 and at a point between said idler and driving rollers. The upper threshing-apron 24 is somewhat shorter than the lower threshing-apron 23, and the front idler-roller 36 for this upper apron is arranged, preferably, in the vertical plane of the intermediate supporting-roller 38 for the lower apron, (see Fig. 3,) whereby considerable surface on the front part of the lower apron is exposed beyond the front end of the upper apron, on which surface the heads of the grain may be swept by the rotary movement of a grain-reel which will be presently described.

It is to be understood that the shaking motion which is given to the floor 34 is at right angles to the travel of the endless aprons 23 24. To convey the grain to the rear of the machine and simultaneously thresh it, it is necessary to propel the upper apron 24 in a direction for its lower lead to travel in the same direction as the upper lead of the lower conveyer 23; but as this upper apron is movable transversely with the shaking-floor 34 I find it desirable to employ friction-gearing as the means for giving the endless traveling motion to the upper apron. It is therefore my purpose to provide the shaft 37ᵃ of the upper-apron roller 37 with a friction drive-pinion 39, the latter adapted to have the necessary frictional contact with a wide-faced friction drive-wheel 40, which is secured to the shaft 26ᵃ of the lower-apron-driving roller 26. By reference to Figs. 3 and 4 it will be seen that the friction-wheel 40 will rotate the friction-pinion 39 in an opposite direction, so that the rollers 26 27, which propel the upper and lower aprons, will rotate in opposite directions; but at the same time the friction-pinion 39 on the driving-roller for the upper apron is free to slide or travel along the wide-faced friction drive-wheel 40 without throwing the two rollers out of operative relation, thus permitting the upper apron to partake of the shaking motion given to the table 34 and insuring the endless travel to said upper apron.

It is to be understood that the shaking-table 34, which supports the rollers of the upper apron, is guided by the ways 33 on the posts to move in a path parallel to the lower apron, and thus the necessary parallel relation is preserved between the two aprons for the devices on their opposing working surfaces to coact in rubbing or threshing the grain from the straw.

The transverse shaking motion is given to the table 34 and the upper apron by connections with the compound intermediate gear, said connections comprising a bell-crank lever 41, the pitman 42, and the wrist-pin 43, the latter being fast with the gear element 30 31. The bell-crank lever 41 is fulcrumed to a suitable part of the frame member for one arm of said lever to be connected pivotally with the shaking table or floor 34, and the other arm of said lever is connected with one end of the pitman 42, the opposite end of said pitman being fitted on the wrist-pin 43.

Each apron of the threshing mechanism may consist of a plurality of layers or plies—three, four, or more in number, as may be found necessary to secure the requisite strength and stiffness—and said apron may be of any suitable material—as, for example, leather or rubber fabric. For protecting the surface of the apron from wear I find it desirable to provide the working surface of the apron with a metallic armor, and this working surface is augmented by the provision of a large number of studs or teeth, which constitute the means for rubbing the grain from the straw.

The metallic armor for the lower apron 23 consists of a plurality of plates or bars 44, having the short rounded teeth or studs 45, and the upper apron 24 is provided with similar metallic plates or bars 46, each bar having the short rounded teeth or studs 47. The metallic plates, with the studs or teeth thereon, are secured to each apron across the same to extend the full width thereof, and said bars or plates are spaced at short intervals from each other in order to give the apron the necessary pliancy for passing around the idler and driving rollers that support the apron on the frame member.

It is to be understood that the lower apron 23 serves to carry the heads of grain below the upper apron, and the entrance of the straw and grain between the two aprons has a tendency to force the working surfaces thereof apart, so that the studs or teeth on the opposing working surfaces of the two aprons will become unduly separated or spaced, thereby impairing the efficiency of the threshing mechanism to a certain extent. This separation of the working surfaces under the pressure of the grain is overcome to a certain extent by the employment of the idler-roll 38 below the upper lead of the lower apron; but in order to minimize any tendency of the lower lead of the upper apron to be deflected away from the upper surface of the lower apron I contemplate the employment of a series of pressure-rolls 48. The pressure-rolls are arranged in the same horizontal plane between the rollers 36 37 for the upper apron, and they lie below the shaking floor or table 34, so as to properly engage with the lower lead of said upper apron. The rollers 48 are supported by slidable bearings 49 from the shaking floor or table in order to travel with the latter and to be maintained in operative relation to the upper apron at all times, and these pressure-rolls are pressed upon the lower lead of the upper apron by suitable springs 50, the tension of which springs is adjusted or regulated for the rolls to maintain the lower lead of the upper apron for the teeth or studs 47 thereon to have sufficient clearance relative to the teeth 45 on the upper lead of the lower apron, whereby the upper apron may partake of the transverse shaking movement given to the table or floor without the teeth of said upper apron engaging with the teeth of the lower apron.

A horizontal reel 51 has its shaft supported by suitable posts 52 over the cutter apparatus 18 on the frame member 11, and this horizontal reel is equipped with a sprocket-wheel 53, around which passes a sprocket-chain 54, which is driven by a sprocket-wheel 55 of the shaft 37ᵃ of the driving-roller 37 for the upper apron, whereby the reel is rotated in a direction to sweep the heads of the grain severed by the cutter apparatus upon the exposed front portion of the long lower apron 23.

The grain which is threshed and separated from the straw is delivered at the rear end of the lower apron to a hood 58 and to a shaking-pan 56. The hood partially incloses the rear end of the lower apron, and the shaking-pan is arranged in an inclined position relative to the horizontal plane of said lower apron. Said pan is slidably supported by the hood and the casing of a screw conveyer in a proper position below said apron by resting on lips of the hood and the conveyer-casing, although I do not limit myself to these specific devices for supporting the shaking-pan. At the rear end portion of the shaking-pan the hood 58 is secured to the frame 11, said hood extending in rear of the roller 26 and terminating in the horizontal plane of the upper lead of the lower apron. The hood is arranged for the straw to pass thereover and be discharged from the rear end of the machine, while the grains of wheat or other material threshed by the apparatus will be caught in the hood for delivery to the shaking-pan. This shaking-pan is inclined toward the fixed casing 59 of a screw conveyer 61, and on the upper surface of this shaking-pan is provided a series of ledges or shoulders 60, which tend to agitate the contents of the pan or bottom and preliminarily separate the kernels of wheat from the chaff. The screw conveyer 61 is arranged longitudinally in its casing 59, the shaft 62 of said screw conveyer being provided at one end with a pulley 63, around which passes a belt 64 from a pulley 65 on the shaft 26ª of the rear driving-roller for the lower apron. Said screw-conveyer shaft is also provided with the crank-disks 66, to which are connected the pitmen 67, the latter being pivoted to the shaking-bottom 56, whereby the screw conveyer is driven from the roller 26 of the lower apron, and it in turn imparts the desired reciprocating motion to the grain bottom or pan which delivers to the casing of the screw conveyer.

I have equipped the prime frame member 10 of my machine with a cleaning-shoe 68, which is arranged to discharge the chaff toward the left-hand side of the machine, as indicated by Fig. 1 and clearly shown by Fig. 5. This shoe is suspended by the links 69 in a casing 70, supported in a fixed position by suitable means on the frame member 10, said casing having a discharge-opening 71. The shoe-fan 72 is situated between the shoe and the elevator-boot 73, the latter being arranged between the frame members. (See Fig. 1.) The lower part of this elevator-boot is connected operatively with the delivery end of the casing 59 for the screw conveyer, and within the elevator-boot is arranged the endless bucket elevator 74. (Indicated by dotted lines in Fig. 5.) The lower end of said bucket elevator passes around an idle shaft in the foot of the elevator-boot; but the upper end of this bucket elevator is supported by a driving-shaft 75, the boot or casing of the elevator discharging through an inclined spout 76 to the shoe of the grain-cleaning mechanism.

The motion of the main driving-shaft 12 is communicated to an auxiliary shaft 77, the latter journaled in suitable bearings on the frame member 10, said shaft 77 having a sprocket-wheel 78, which is engaged by a sprocket-chain 79, the latter being propelled by a sprocket 79ª on the main driving-shaft 12, as shown by dotted and full lines in Fig. 1. The shoe-driving shaft 80 is supported on the side of the fixed casing 70, and this shaft has a sprocket-gear 81, propelled by a sprocket-chain 82 from a sprocket-wheel 83 on the auxiliary shaft 77. At one end the shoe-driving shaft is geared through intermeshing bevel-gears 84 85 with the shaft of the shoe-fan 72. (See Fig. 1.) The shoe is reciprocated by a crank-disk 86 on the fan-shaft and by the pitman 87, which is pivoted to the crank-disk and to the shoe, as indicated by dotted lines in Fig. 5. The auxiliary shaft 77 has a sprocket-gear 89, which propels the sprocket-chain 90, the latter engaging with a sprocket-wheel 75ª on the conveyer driving-shaft 75 for the endless bucket elevator or conveyer 74. It is thus evident that the fan is rotated and the shoe is reciprocated by connections with the auxiliary shaft, and this same shaft drives the endless elevator by which the grain is transferred from the casing of the screw conveyer to the shoe of the cleaning mechanism.

It will be recalled that the frame member 10 is supported by the ground-wheel and that the frame member 11 is equipped at its outer end with a caster-wheel. It is desirable to connect the inner contiguous ends of the two frame members, and this connection may be effected in any suitable way. As one means for connecting the inner ends of said frame members I have shown by Figs. 1 and 6 a horizontal arm 91, which is fast with the frame member 11 at a point just in rear of the cutter apparatus, said arm extending from the frame member 11 and provided with a roller-sleeve 92, which is fitted in a slot 93, formed in one end of a lever 94, the latter being fulcrumed on the frame member 10. Any suitable means may be adopted for shifting the position of this slotted lever—such, for example, as the hand-lever 95 and the link-rod 96—the whole being arranged to adjustably support the inner end of the frame member 11, so that said end of the frame may be raised or lowered a limited distance.

The operation may be described as follows: The machine is drawn across the field by the team through a suitable draft appliance, and the clutch is thrown into gear with the ground-wheel, thereby rotating the main driving-shaft 12 and the several shafts and rollers to actuate the various mechanisms of the combined machine. The heads of grain are cut by the cutter apparatus and swept by the reel upon the exposed front portion of the lower apron 23, and this apron carries the grain underneath the upper short apron 24. The bell-crank lever and pitman connected with the intermediate compound gear reciprocate the shaking table or floor 34 and the short upper apron 24 in a direction across the upper face of the lower apron 23, and at the same time the friction driving-gear 39 40 between the rollers 26 27 of the two aprons operates to propel the endless upper apron in a direction for its lower lead to travel in the same direction as the upper lead of the lower apron. By reason of the traveling motion of the endless aprons and the transverse shaking motion given to the upper apron the grain is carried between the two aprons and is subjected to a threshing action by the rounded studs or teeth on the opposing faces of the aprons. This threshing action of the teeth separates the kernels or grains of wheat from the straw, and it is thus evident that the grain is threshed at a period immediately following the harvesting thereof. The straw is discharged from the rear of the threshing-apron over the hood of the shaking grain bottom or pan, while the kernels or grains of wheat are caught in the hood, so that they will flow over the step-shaped surface of the grain-pan, the latter being reciprocated by connection with the shaft of the screw conveyer. The grain is delivered from the inclined pan or bottom to the screw conveyer, by which the grain and chaff are transferred to the elevator, the latter serving to deposit said grain and chaff upon the shoe of the cleaning mechanism. The chaff is blown from the grain by the blast from the shoe-fan, so as to be discharged at the left-hand side of the machine, while the clean grain passes through the shoe-riddles to a suitable discharge-spout for the purpose of bagging the grain.

It is evident that I may employ a carrier in rear of the threshing mechanism to receive the straw from the latter, said carrier being operable to deposit the straw in a wagon at the left-hand side of the machine; but as this is an obvious expedient I have not considered it necessary to illustrate the same.

Changes may be made in the form and proportion of some of the parts while their essential features are retained and the spirit of the invention embodied. Hence I do not desire to be limited to the precise form of all the parts as shown, reserving the right to vary therefrom.

Having thus described the invention, what I claim is—

1. In a combined header and thresher, the combination with a cutter mechanism, of a pair of endless coacting aprons having threshing studs or teeth, one of said aprons extending beyond the other and terminating adjacent to the cutter mechanism for conveying the grain therefrom, means for moving one apron in a path at right angles to the traveling motion of the aprons, and means for imparting traveling motion to both aprons, substantially as described.

2. In a combined header and thresher, the combination with a cutter mechanism, of a pair of endless coacting aprons having threshing studs or teeth on their opposing faces, one of said aprons extending beyond the other and terminating adjacent to the cutter mechanism, means for propelling the longer apron, a friction driving mechanism between the two aprons for driving the shorter apron from the longer apron, means for moving one apron across the face of the other apron, and means for sweeping the grain from the cutter apparatus upon the exposed surface of the longer apron, substantially as described.

3. In a combined header and thresher, the combination with a cutter mechanism, of a pair of endless coacting aprons having threshing studs or teeth on their working faces, one of said aprons extending beyond the other and terminating adjacent to the cutter mechanism, a shaking table or floor supported for movement in a path across the endless travel of the aprons and said floor or table carrying one of the aprons, means for reciprocating said floor or table, a driving mechanism for propelling a roller of the non-shaking apron, and a friction driving-gear operable by the roller of the non-shaking apron and adapted to impart the endless travel to the apron which is carried by the shaking floor or table, substantially as described.

4. In a combined header and thresher, the combination with a cutter apparatus, of a threshing mechanism comprising endless traveling aprons having threshing teeth or studs on their opposing faces, one of said aprons being longer than the other to be partly exposed beyond said other apron and having an end portion thereof arranged contiguous to the cutter apparatus to receive the heads of grain directly therefrom, and means for moving the short apron across the surface of the long apron, substantially as described.

5. In a combined header and thresher, the combination with a harvesting mechanism, of an endless apron supported by rollers and arranged to receive the heads of grain directly from the harvesting mechanism, another apron of less length than the first-named apron and supported in parallel relation thereto, said aprons having threshing studs or teeth on their working faces, means for giving the traveling motion to the lower apron, means for moving the upper short apron across the face of the long lower apron, and a friction driving-gear between a roller of the lower apron and a roller of the upper apron to give the traveling motion to the latter, substantially as described.

6. In a combined header and thresher, the combination with a cutter mechanism, of a pair of endless aprons having threshing teeth or studs on their working faces, one of said aprons being longer than the other and receiving the grain from the cutter apparatus, a reciprocatory floor or table guided to move in a path at right angles to the travel of the endless aprons and said floor or table carrying the shorter apron, and pressure devices supported by the floor or table to maintain the active lead of the apron carried thereby in parallel relation to the lead of the other apron, substantially as described.

7. In a combined header and thresher, the combination with a cutter mechanism, of a reciprocatory floor or table, a pair of endless traveling aprons having threshing-teeth on their opposing surfaces, one of said aprons being longer than the other to convey the grain from the cutter apparatus and the shorter apron carried by the floor or table to reciprocate therewith across the face of the long apron, means for giving the endless traveling motion to said aprons, and pressure devices supported by the floor or table in operative relation to the short apron, substantially as described.

8. In a combined header and thresher, the combination with a frame having elevated guideways, and a cutter apparatus on the front part of said frame, of the shaking floor or table slidably supported in the guideways, apron-rollers mounted in the frame, other apron-rollers supported by the floor or table, a pair of endless traveling aprons one longer than the other to convey the grain from the cutter apparatus and said aprons supported respectively by the rollers on the frame and on the shaking-table, a friction drive-gear between driving-rollers of the two aprons, and means for reciprocating the table and the apron carried thereby across the path of the apron supported on the frame, substantially as described.

9. In a combined header and thresher, the combination with a cutter mechanism, of a pair of endless coacting aprons, one of which is longer than the other to convey the grain from the cutter apparatus, and yieldable pressure devices coöperating with one apron, whereby the pressure of grain between the aprons is prevented from moving the working surfaces thereof away from operative relation, substantially as described.

10. In a combined header and thresher, the combination with a cutter apparatus, of endless threshing-aprons having studs or teeth on their opposing faces, one of said aprons being movable across the face of the other apron, a grain-pan below the delivery end of the lower apron and arranged to partially embrace the latter, and means for reciprocating said grain-pan, substantially as described.

11. In a combined header and thresher, the combination with a cutter mechanism, of a threshing mechanism comprising endless aprons provided with threshing-teeth on their working surfaces, one of said aprons being movable across the path of the other apron, a screw conveyer below the lower apron, a grain-pan supported partly below the lower apron to deliver the grain to the casing of said screw conveyer and having a hood which conforms to the curvature of the lower apron, and driving devices between the screw conveyer-shaft and the grain-pan to reciprocate the latter, substantially as described.

12. In a combined header and thresher, the combination with a main driving-shaft having a master-gear, of a cutter apparatus driven from said shaft, a pair of endless parallel aprons provided with threshing-teeth on their working faces, one of said aprons being longer than the other to convey the grain from the cutter apparatus, means for supporting the upper apron for movement across the face of the lower apron, a compound intermediate gear provided with a wrist-pin and driven by the master-gear, sprocket-gears between the compound intermediate gear and a driving-roller of the lower apron, a bell-crank lever having pitman connection with the compound intermediate gear and with the supporting means for the upper apron, and a friction driving-gear between the driving-roller of the lower apron and the corresponding roller of the upper apron, substantially as described.

13. In a combined header and thresher, the combination of a two-part frame, a cutter mechanism supported by one member of the frame, a pair of threshing-aprons supported by said frame member and having one apron longer than the other to convey the grain from the cutter mechanism below the other threshing-apron, a cleaning mechanism supported by the other member of the frame, a main driving-shaft, driving devices propelled by said shaft for operating the cutter mechanism, the threshing-aprons and the cleaning mechanism, and an elevator also actuated by the shaft and arranged to receive grain from the threshing-aprons and deliver the same to the cleaning mechanism, substantially as described.

14. In a combined header and thresher, the combination with a frame and a cutter mechanism thereof, of posts fixed to the frame and having the guideways, a reciprocating floor or table fitted slidably in the guideways, an upper apron carried by said floor or table and having the threshing-teeth, a lower longer apron supported by the frame in parallel relation to the upper apron and extending beyond the latter to a point adjacent to the cutter apparatus, a series of yieldable pressure-rolls suspended from the floor or table and riding upon the lower lead of the upper apron, means for giving the traveling motion to the aprons, and means for reciprocating the table and upper apron across the lower apron, substantially as described.

In testimony that I claim the foregoing as my own I have hereto affixed my signature in the presence of two witnesses.

JOSEPH G. EVANS.

Witnesses:
HENRY G. STRATTON,
RICHARD H. ORMSBEE.